United States Patent [19]
Tavares et al.

[11] Patent Number: 5,515,537
[45] Date of Patent: May 7, 1996

[54] REAL-TIME DISTRIBUTED DATA BASE LOCKING MANAGER

[75] Inventors: Carlos M. Tavares, Somerset; Durval M. Tavares, Dighton, both of Mass.

[73] Assignee: The United States of America as represented by the Secretary of the Navy, Washington, D.C.

[21] Appl. No.: 69,816

[22] Filed: Jun. 1, 1993

[51] Int. Cl.[6] .............................. G06F 13/37; G06F 13/14
[52] U.S. Cl. ................. 395/732; 364/241.8; 364/242.8; 364/940.8; 364/DIG. 2; 395/288; 395/289; 395/299; 395/477; 395/726
[58] Field of Search .................................. 395/600, 200, 395/325, 477, 298, 288, 299, 600, 726, 732; 370/85.4, 85.5

[56] References Cited

U.S. PATENT DOCUMENTS

| | | | |
|---|---|---|---|
| 4,748,560 | 5/1988 | Kataoka | 395/325 |
| 5,053,946 | 10/1991 | Jain | 395/275 |
| 5,072,373 | 12/1991 | Dann | 395/200 |
| 5,155,725 | 10/1992 | Khalil | 370/85.5 |
| 5,175,851 | 12/1992 | Johnson et al. | 395/600 |
| 5,247,684 | 9/1993 | Tavares et al. | 395/706 |
| 5,301,333 | 4/1994 | Lee | 395/732 |
| 5,307,487 | 4/1994 | Tavares et al. | 395/650 |
| 5,377,353 | 12/1994 | Yamaguchi | 395/650 |

Primary Examiner—Thomas G. Black
Assistant Examiner—Hosain T. Alam
Attorney, Agent, or Firm—Michael J. McGowan; Michael F. Oglo; Prithvi C. Lall

[57] ABSTRACT

A method of data sharing between processors on the same network utilizes token migration for providing a data locking mechanism. A token migrates between the processors for each original data item and its replicas. Only the processor having possession of the token can perform certain operations such as updating and transmitting this updated information to the other processors. Two different queuing arrangements are described for giving up or retaining possession of the token when a processor, not in possession of the token makes a request for the token.

16 Claims, 12 Drawing Sheets

REAL-TIME DISTRIBUTED DATA BASE LOCKING MANAGER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a data locking mechanism for concurrent processes executing on networked processors. The invention has particular application within a submarine combat system. The inventive data locking mechanism is called "token migration" and takes advantage of the processing structure of submarine combat systems. Token migration like many other techniques allows at most one process in at most one processor to lock and access any data item.

(2) Description of the Prior Art

A prior art system dealing with communications disclosed by Coden in U.S. Pat. No. 4,789,982 describes a method for simulating a token passing ring network on a bus network. In operation, one node on receiving the token transmits data and then regenerates the token.

Another prior art system dealing with communications disclosed by Akai in U.S. Pat. No. 4,903,190 discloses a method of data transmission for a logical ring processor system which enables a processor to access internal memory of the processors which are not normally directly accessible from the data transmission loop. One portion of each common memory is reserved for a command signal transmitted on the transmission loop. Data from the internal memory of one of the processors is made available only when the command signal from another processor is received. In order to avoid data locking the common network memory increases as the square of the number of processors.

Hirabayashi et al. in U.S. Pat. No. 4,949,083 discloses a communication system which passes a token to each control unit which then may reject the token or may send data over the common transmission line. In either case, the token is then directed to continue on its preset transfer sequence.

Mansfield et al. in U.S. Pat. No. 5,014,192 discloses a data management system for multiprocessor systems connected in a logical ring configuration. A token is passed throughout the system. When a processor received the token it may send a frame of data or pass the token to the next processor. Although the system deals with satisfying a request for files in a network distributed file system connected as a logical ring there is no discussion of a data locking mechanism.

SUMMARY OF THE INVENTION

Accordingly, it is a general purpose and object of the present invention to provide an improved system that regulates and serializes access by processors to data items stored in a network. A further object of the invention is the new application of an existing network architecture building block known as a token that allows only one processor at a time to transmit data within the network.

These objects are accomplished with the present invention by providing a system in which a migrating token must be seized by a processor in order to perform specific processes. The token can reside in but one processor. In one embodiment of the invention the processor seizing the token can perform all processes before relinquishing the token. Thus, an earlier request for the token by another processor is put on hold by a later request from the processor holding the token. In other words, requests by the processor holding the token have priority over requests from other processors. In another embodiment the requests are queued and executed in the order received with no priority given.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Throughout this disclosure a term "data item" is often used. Data item as used in this disclosure stands for any unit of related data that will be shared within a computing system. It can be a single variable, a record of variables, an aggregation of records of the same type, or an aggregation of records of dissimilar types. Data items are at least one computing system word in length. Data items are often accompanied by computer system objects (e.g., semaphores) and primitives (like signal and wait) to provide exclusive access to the data item (locking). The collection of data items within a processor will be termed a "data base". A "processor" is defined to be a computer with at least one central processing unit, a random access memory, and a network interface. "Process" is a task performed by a software entity, undergoing execution within the hardware of a processor. "Message Cost" reflects the performance requirements of network communication hardware (e.g., the more messages the more bandwidth required, and hence the more expensive the required hardware).

In the descriptions that follows, references to figures will be made. The large sharp cornered boxes represent a data base which is the set of data items (the smaller sharp cornered boxes) within the local machine. The small round cornered boxes represent either processes or hardware within a processor. The round cornered boxes fall into one of two categories: data clients (local data users) and data servers (which are either data base managers with lock management or data replication hardware). The flag objects represent the system objects to support locking. The servers are interconnected to provide a homogeneous view of data and concurrent access to data.

Equations are used to characterize the performance of certain data locking-techniques. The i-th element of any system component type is expressed as $c(i)$. The average of all elements of the component type is c. The summing of all elements is symbolized by $\Sigma$.

The nature of combat system processing is to localize access to certain data items, usually, over long periods of time. Examples include a contact management algorithm updating contact position and velocity estimates, a history manager maintaining rings of historical data, a weapon algorithm producing presets, and an interface program acquiring sensor data. Locks to the same data item by the same process usually happen over minutes to hours, with sporadic lock access by other processes being extremely rare. The nature of combat system processing has data in the system for long periods of time, with the data being used largely in read mode, i.e., reads far outweigh writes by one to two orders of magnitude. Examples include a history manager reading sensor measurements every second and producing an averaged sensor measurement every twenty seconds (in the present submarine combat system prototypes this is 20 reads to 1 write); a contact management algorithm reading hundreds of sensor measurements every twenty seconds so as to update a contact solution (in the present submarine combat system prototypes this is up to 1000 reads to 1 write); and a display module updating a graphics visualization several times a second with the one second position kept contact solutions (in the present submarine combat system prototypes this ranges from 6–10 reads to 1 write). It has been concluded that data replication is critical to accomplish real-time processing within the prototype combat systems being developed. Replicated systems have data readily available at most processors by maintaining local copies of data items that are being modified locally or remotely. This allows read accesses to proceed without having to leave the local processor. In contrast, centralized systems (see FIG. 1) and distributed non-replication systems (see FIG. 2) become bottle necks in a system that exhibits locality and is dominated by reads. For completeness, both are discussed below.

Figure 1:
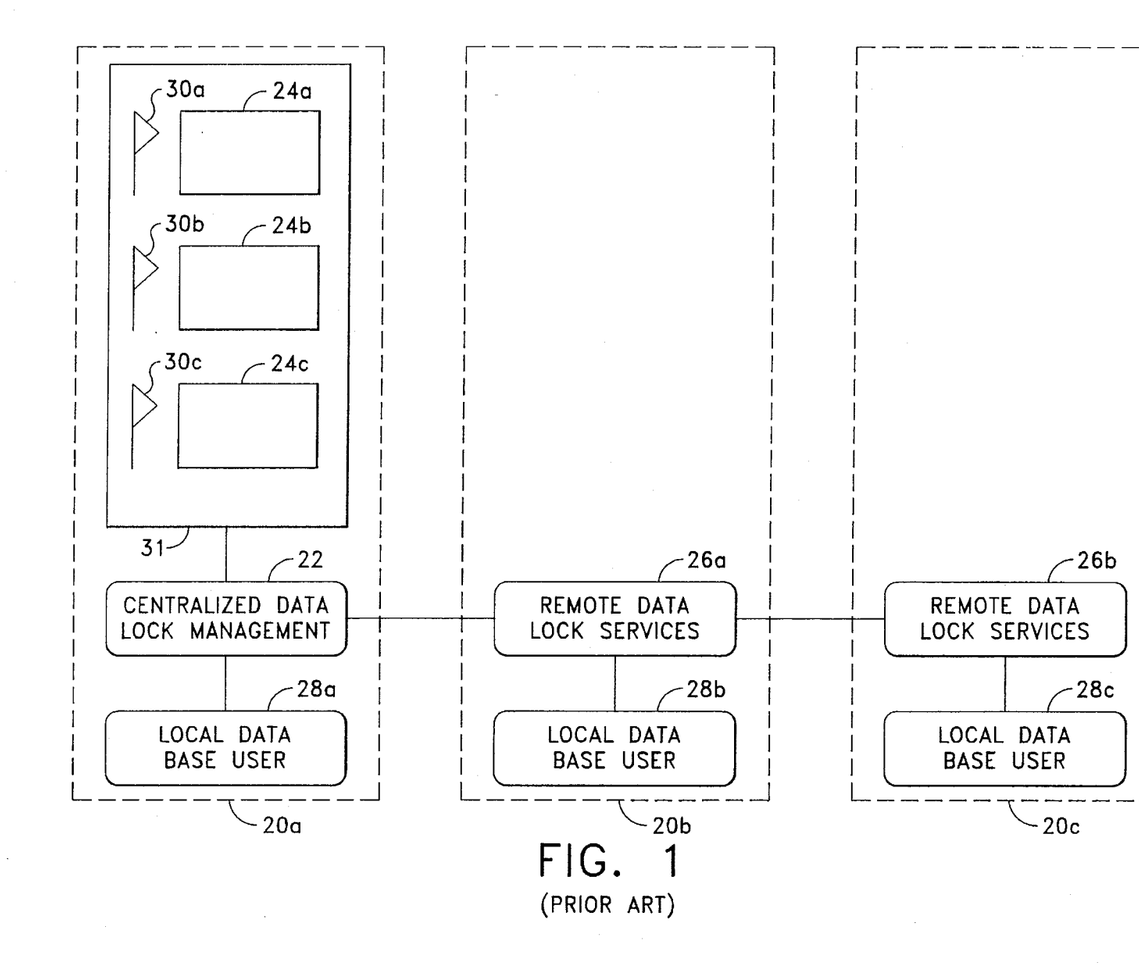
FIG. 1 is a block diagram representing the centralized prior art approach for data sharing between processors.

In the prior art so-called "centralized approach" of FIG. 1 three processors 20a, 20b, and 20c are shown. The processor 20a provides the centralized data lock management 22, consisting of a software entity providing logic, whose function is to administer the lock and unlock requests for all the data items 24a, 24b, and 24c. When one of the remote data lock services 26a or 26b wishes to lock data item 24a, it simply sends a message to the centralized data lock management 22 requesting a lock in a particular lock mode. If data item 24a is locked in an incompatible mode, then the request is delayed until it can be granted. Once it has been determined that the lock request can be granted, the centralized data lock management 22 sends a message back to the initiator of the request indicating that the lock request has been granted. FIG. 1 also shows the local data base users 28a, 28b, and 28c, the flags 30a, 30b, and 30c, and the data base 31. The flags shown in the drawings represent the system objects to support locking. In a system that is read dominant, this technique is much too costly, i.e., all reads must go to processor 20a. The message cost for reads in this technique can range from 6 nm to 1000 nm; wherein n is the number of processors and m is the average number of locks per processor. See the single coordinator discussion for the n and m. The 6 and 1000 come from the characterization of combat system processing. As shown, this technique is much too expensive to be viable.

Figure 2:
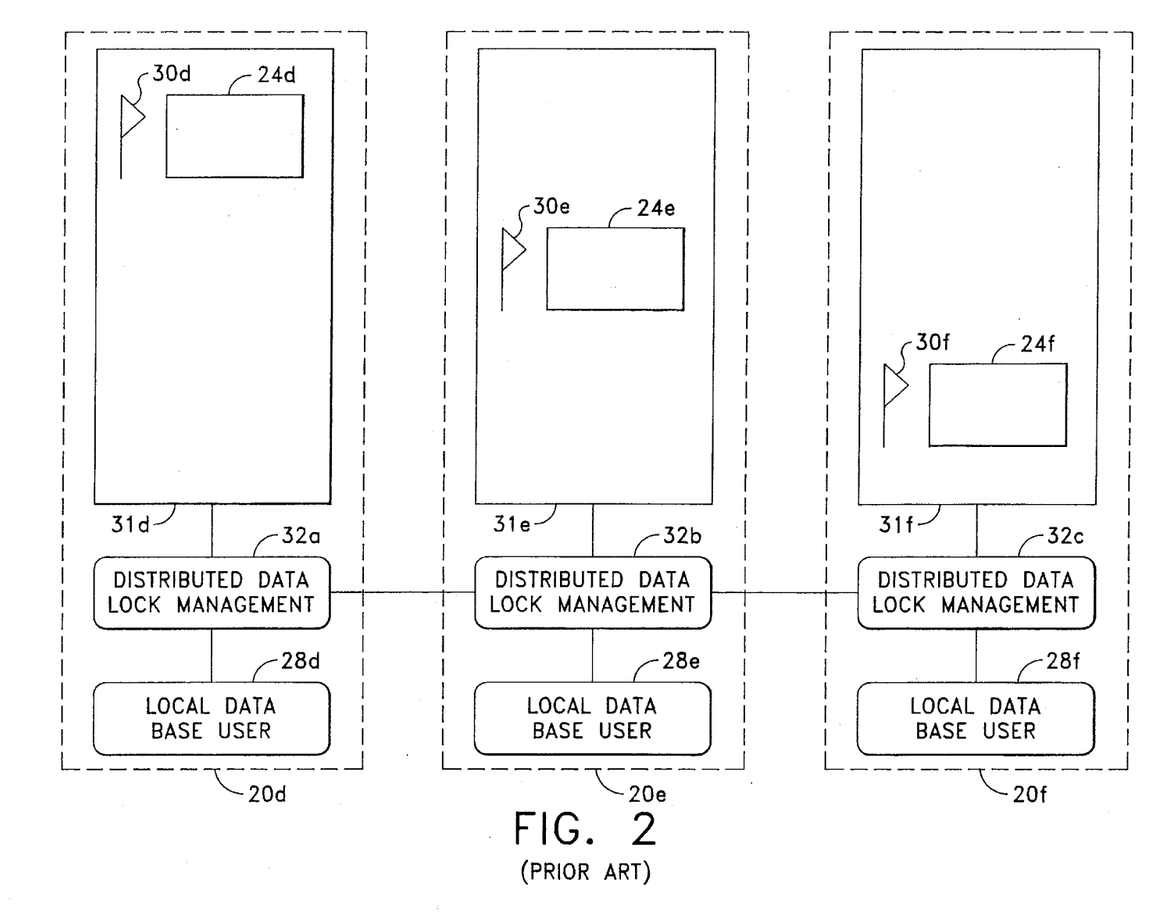
FIG. 2 is a block diagram representing the non-replicated prior art scheme for data sharing between processors.

In the prior art so-called "non-replicated scheme" of FIG. 2, each processor 20d, 20e, and 20f maintains a local distributed data base lock management 32a, 32b, and 32c whose function is to administer the lock and unlock requests for those data items that are stored in the local processor 20d, 20e or 20f. When a data item access wishes to lock data item 24d at processor 20d, it sends a message to the distributed data lock management 32a at processor 20d requesting a lock in a particular lock mode. If data item 24d is locked in an incompatible mode, than the request is delayed until it can be granted. Once it has been determined that the lock request can be granted, the distributed data lock management 32a sends a message back to the initiator of the request indicating that the lock request has been granted. FIG. 2 also shows data items 24e and 24f, local data base users 28d, 28e, and 28f, flags 30d, 30e, and 30f and data bases 31d, 31e, and 31f. In a system that is read dominant, this technique is much too costly, i.e., all reads must go to the particular processor 20d, 20e, or 20f having the respective data item 24d, 24e, or 24f requested. The message cost for "reads" in this technique can range from 6 nG to 1000 nG; wherein n is the number of processors and G is the average number of locks per processor. (See later herein for a discussion the primary copy scheme which amplifies upon the n and G parameters.) The 6 and 1000 come from the characterization of combat system processing. As shown, this technique is much too expensive to be viable.

In general, schemes differing from those above, showing replication techniques, seek to reduce network read messages on the principle that writes are rare and reads are many. Replication takes a data item update at the local processor, and sends out a message on the network to update other copies of the data item. Replication eliminates the cost of dozens to hundreds of network read messages from processors needing the data item, and it eliminates any one processor or set of processors from becoming a bottleneck. The cost of replication with the techniques described below is nm (see below). The replication costs nm, added to the locking costs described below, added respectively to the unlocking costs nG (single coordinator approach, majority protocol) and nG (primary copy scheme)—note that token migration implies no unlock costs—are still much lower than the read costs discussed above. There is a hidden cost to replication; more memory is required to store the data item copies. In the systems of the invention, memory is cheaper and more readily available than in so-called "high performance networks" such as the well-known Fiber Distributed Data Interface (FDDI). Presently, FDDI costs over ten times more per processor than the cost of memory per processor in submarine combat systems.

Figure 3:
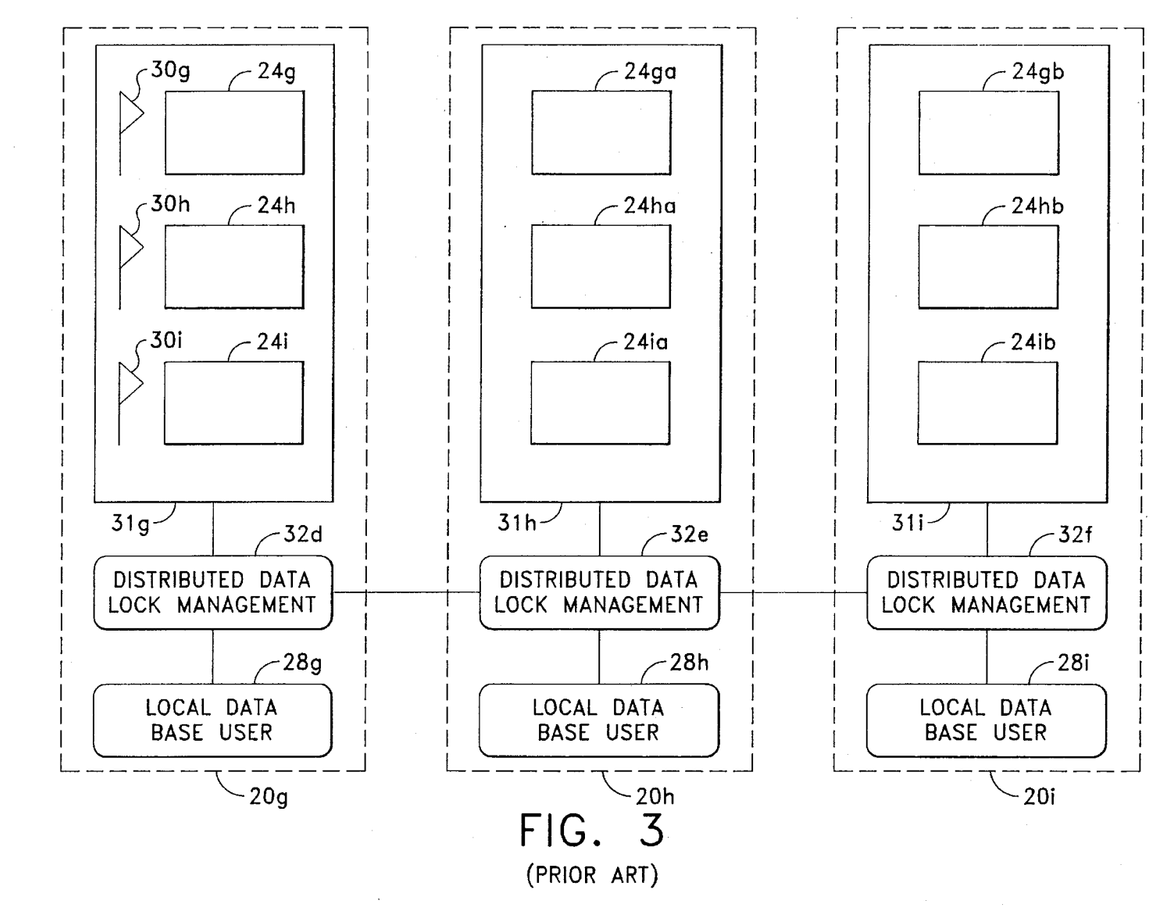
FIG. 3 is a block diagram representing the single coordinator prior art approach for data sharing between processors.

The system of FIG. 3 is the prior art so-called "single coordinator approach" and it maintains one single lock manager that resides in the distributed data lock management 32d of processor 20g. All lock and unlock requests are made to processor 20g. When an access needs to lock a data item 24g, it sends a lock request to processor 20g. The distributed data lock management 32d determines whether the lock can be granted immediately. If, so, it sends a message to that effect to the processor 20h or 20i from which the lock request was initiated. Otherwise, the request is delayed until it can be granted, at which time, a message is sent to the site at which the lock request was initiated. The access can then read the data item from any one of the processors at which an original or a replica of the data item exists. Original data item 24g has replicas 24ga and 24gb. Original data item 24h has replicas 24ha and 24hb. Original data item 24i has replicas 24ia and 24ib. Processor 20g has local data base user 28g in addition to data lock management 32d. Processor 20h has local data base user 28h in addition to data lock management 32e. Processor 20i has local data base user 28i in addition to data lock management 32f. Data bases 31g, 31h, and 31i, as well as flags 30g, 30h, and 30i are also shown. In the case of a write access, all the sites where a replica of the data item resides must be involved in the writing. The cost of this locking technique will be expressed as the total messages M generated in the system for n processors, where each processor p(j) generates m(j) messages for m(j) locks, it follows that:

M is the number of messages sent to processor p(i) and returned from the same while excluding it;

$M=[m(1)+ \ldots +m(j)+ \ldots +m(n)-m(i)]*2;$ $M=\{[\Sigma m(j)]-m(i)\}*2;$ $M=\{n*[\Sigma m(j)]/n-m(i)\}*2;$ $M=[n*m-m(i)]*2;$ and as p(i) approaches an average processor $M=(n-1)*m*2; \lim m(i) \to m;$ $M \approx 2 nm;$ for $n>>1;$ and is the cost for this technique.

Figure 4:
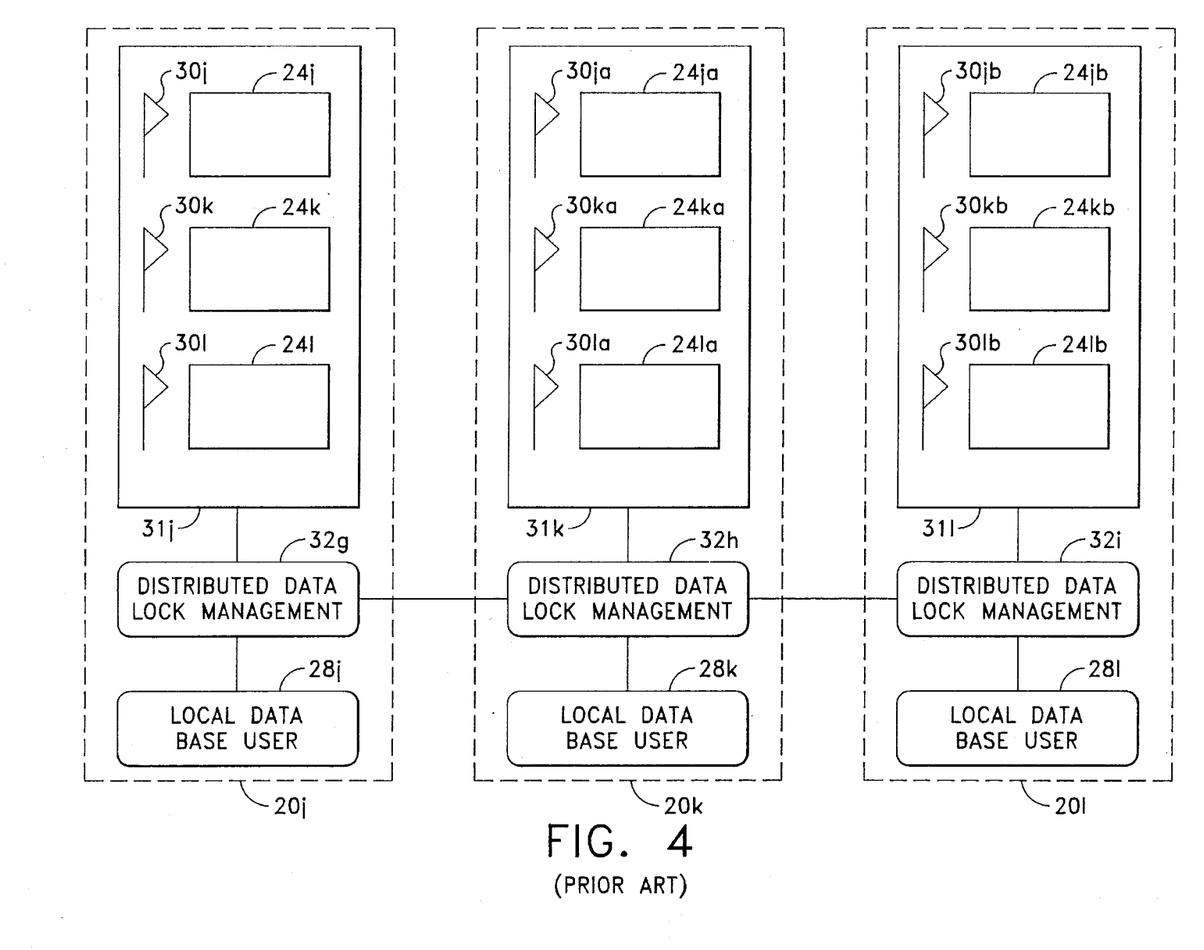
FIG. 4 is a block diagram representing the majority protocol prior art system for data sharing between processors.

Refer now to FIG. 4 for the prior art so-called "majority protocol system." This system maintains a lock manager at each processor 20j, 20k, and 20l. Each manager manages locks for the original data items 24j, 24k, and 24l within data base 31j, or replicas 24ja, 24ka, and 24la within data base 31k, or replicas 24jb, 24kb, and 24lb within data base 31l. When an access wishes to lock data item 24j, which is replicated in n different processors, it must send a lock request to more than half of the n processors in which data item 24j or its replicas 24ja and 24jb are stored. Each lock manager determines whether the lock can be granted immediately at its processor. As before, the response to the request is delayed until it can be granted. The access does not operate on 24j until it has successfully obtained a lock on a majority of the original data item 24j and its replicas 24ja and 24jb. Processor 20j has a distributed data lock management 32g and a local data base user 28j. Processor 20k has a distributed data lock management 32h and a local data base user 28k. Processor 20l has a distributed data lock management 32i and a local data base user 28l. Flags 30j, 30ja, 30jb, 30k, 30ka, 30kb, 30l, 30la, and 30lb are also shown. The cost of this locking technique will be expressed as the total messages M generated in the system for n processors, where each processor p(j) generates m(j) messages for m(j) locks, it follows that:

M is the number of messages broadcasted to all and returned from the majority;

$M=[m(1)+ \ldots +m(j)+ \ldots +m(n)]+[m(1)+ \ldots +m(j)+ \ldots +m(n)]*(n/2);$ $M=[\Sigma m(j)]*\{[\Sigma m(j)](n/2)\};$ $M=\{n*[\Sigma m(j)]/n\}*[(n+2)/2];$ $M=[n*m]*[(n+2)/2];$ $M \approx n*n*m/2;$ for $n>>2;$ and is the cost for this technique.

A conclusion about this technique is that it is more costly than the single coordinator approach whenever n>2 processors. The cost of this technique is the square of n processors where the cost of the single coordinator is linear to the number of processors.

Figure 5:
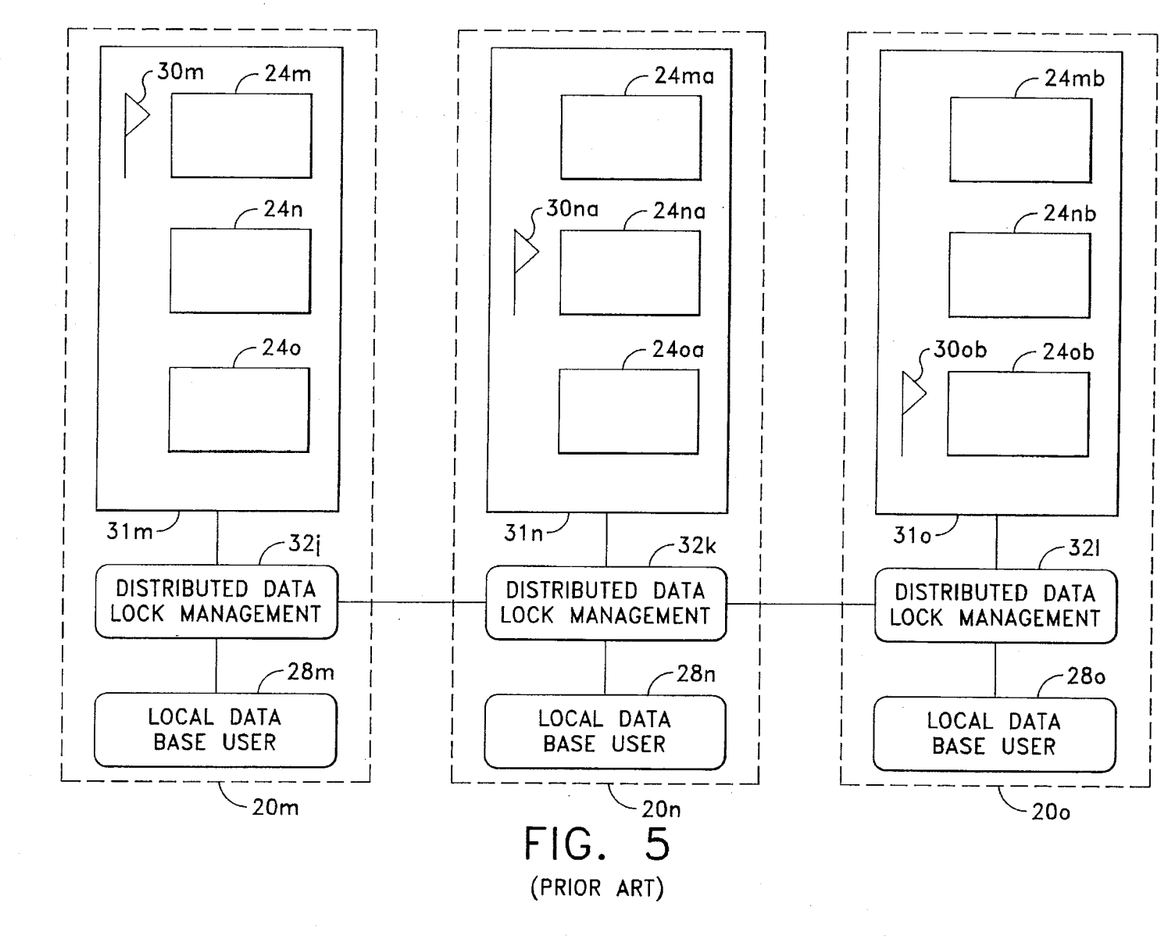
FIG. 5 is a block diagram representing the prior art primary copy scheme for data sharing between processors.

Refer now to FIG. 5 for the prior art so-called "primary copy scheme." In the case of data replication, we may choose one of the replicas as the primary copy. Thus, for each of the original data item 24n and its replicas 24na and 24nb, the primary copy, in this case data item replica 24na, must reside in precisely one processor 20n, which is called the primary processor of original data item 24n and replicas 24na and 24nb. When the access needs to lock data item 24n, it requests a lock at the primary processor 20n of data item 24n. As before, the response to the request is delayed until it can be granted. However, in this technique, message requests m(i) can be satisfied by local requests l(i). The cost of this locking technique will be expressed as the total messages M generated in the system for N processors, where each processor p(j) generates G(j)=(m(j)-l(j)) messages for m(j) locks, it follows that:

M is the number of messages sent to primary copies and returned, excluding local locks;

$M=[G(1)+ \ldots +G(j)+ \ldots +G(n)]*2;$ $M=[\Sigma G(j)]*2;$ $M=\{n*[\Sigma G(j)]/n\}*2$ $M=[n*G]*2;$ $M=2 nG;$ and is the cost for this technique.

A conclusion about this technique is that it is less costly than the single coordinator approach whenever $\Sigma l(j)>m$. This is a criteria that can be fulfilled whenever the primary copies of data items and the processes locking data items are in the same processor. When this happens, nl can rise to exceed m. Worst case; this technique is 2 nm, which means it is no worse than the best of the previous described systems. In practice, it is hard to have data items and processes function in a priori mode together. The present invention seeks a dynamic approach to locking.

The remaining components in FIG. 5 are similar to the components carrying the same numerals in the other figures.

Figure 6:
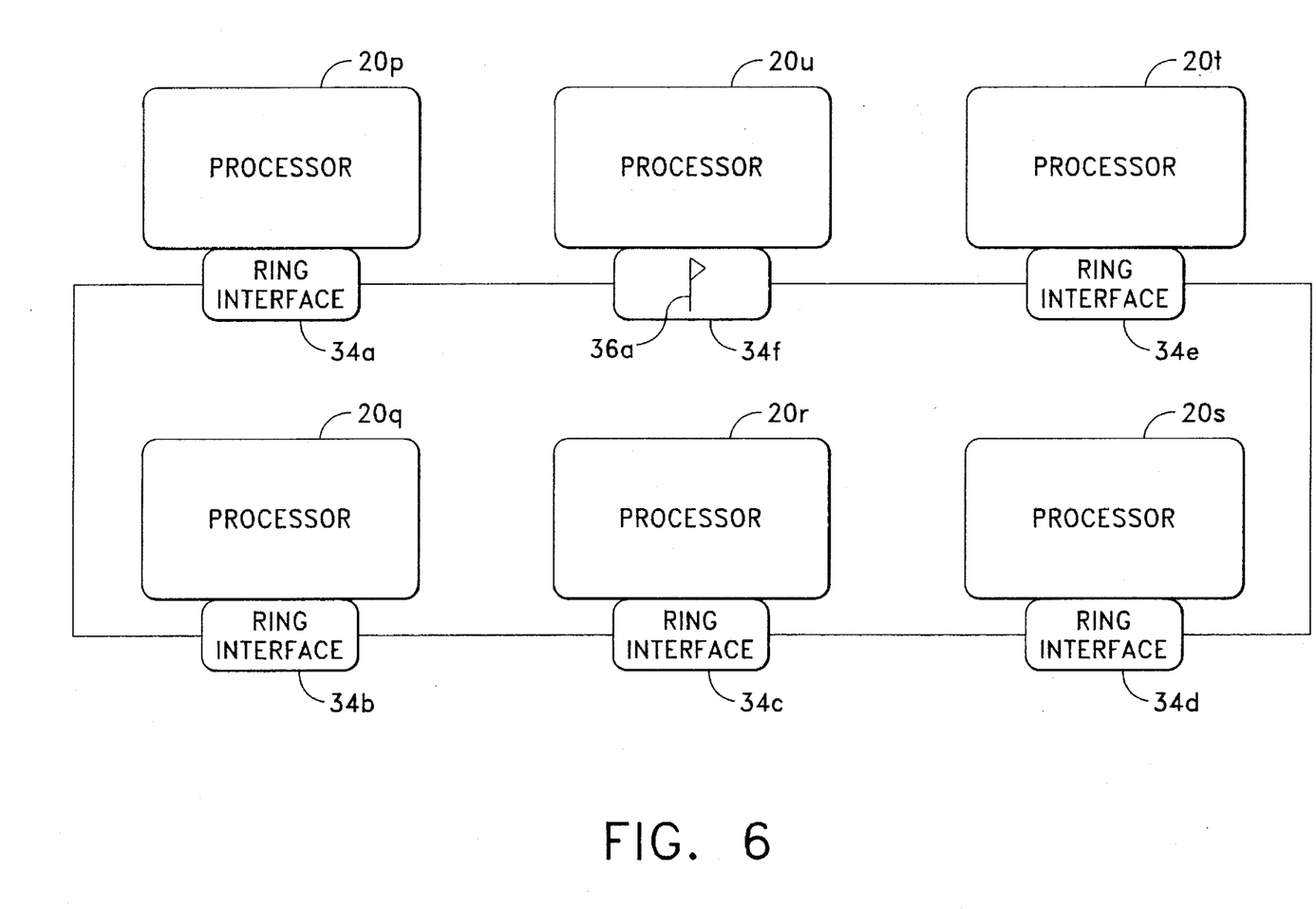
FIG. 6 is a block diagram of a logical/physical token ring for data sharing between processors, encompassed in the present invention.

Referring now to the principles of the present invention FIG. 6 depicts a logical token ring system. This is a simple system with a known worst case. In the system the processors 20p–u take turn sending frames that are network implementations of messages. The processors 20p–u have respective ring interfaces 34a–f. If there are n processors and it takes T seconds to send a frame, no frame will ever have to wait more than nT seconds to get a chance. Logically, the processors 20p–u are organized into a ring, as shown in FIG. 6, with each processor knowing the address of the processor to its left and right. When the logical ring is initialized, the highest numbered processor 20u may send the first frame. After it is done, it passes permission to its immediate neighbor by sending the neighbor a special control frame called a token 36a, as represented by the flag in FIG. 6. The token 36a propagates around logical rings, with only the token holder being permitted to transmit frames. When a processor passes the token, it sends a token frame specifically addressed to its logical neighbor in the ring, no matter where the processor is physically located on the cable. This is the basis of the present invention, token migration.

The physical token ring can also be described using FIG. 6. In the physical token ring a special bit pattern, called a token, circulates around the ring whenever all processors are idle. When the processor wants to transmit a frame, it is required to seize the token and remove it from the ring before transmitting. Because there is only one token, only one processor can transmit at a given instant, thus solving the channel access problem the same way the logical token ring solves it. When message traffic is light, the token will spend most of its time idly circulating around the ring. Occasionally, a processor will seize it, transmit a frame, and then output a new token. However, when the traffic is heavy, so that there is a queue at each processor, as soon as a processor finishes its transmission and regenerates the token, the next processor downstream will see and remove the token. In this manner, the permission to send rotates smoothly around the ring in round robin fashion. The particular logical token ring shown has been implemented by hardware logic connected with each processor, as will be understood by those of skill in the art.

Figure 7:
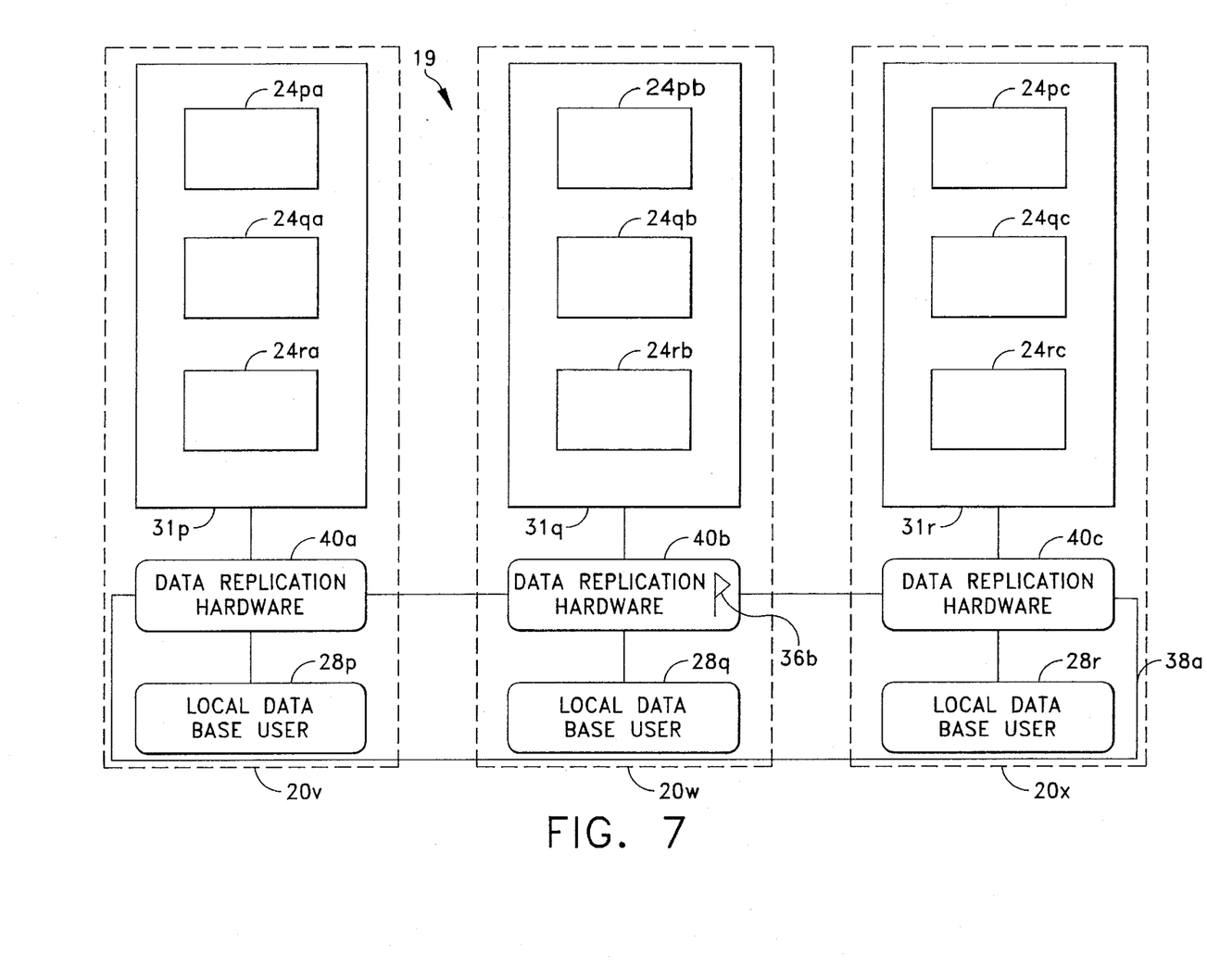
FIG. 7 is a block diagram of data replication hardware for use in data sharing between processors, encompassed in the present invention.
Figure 8A:
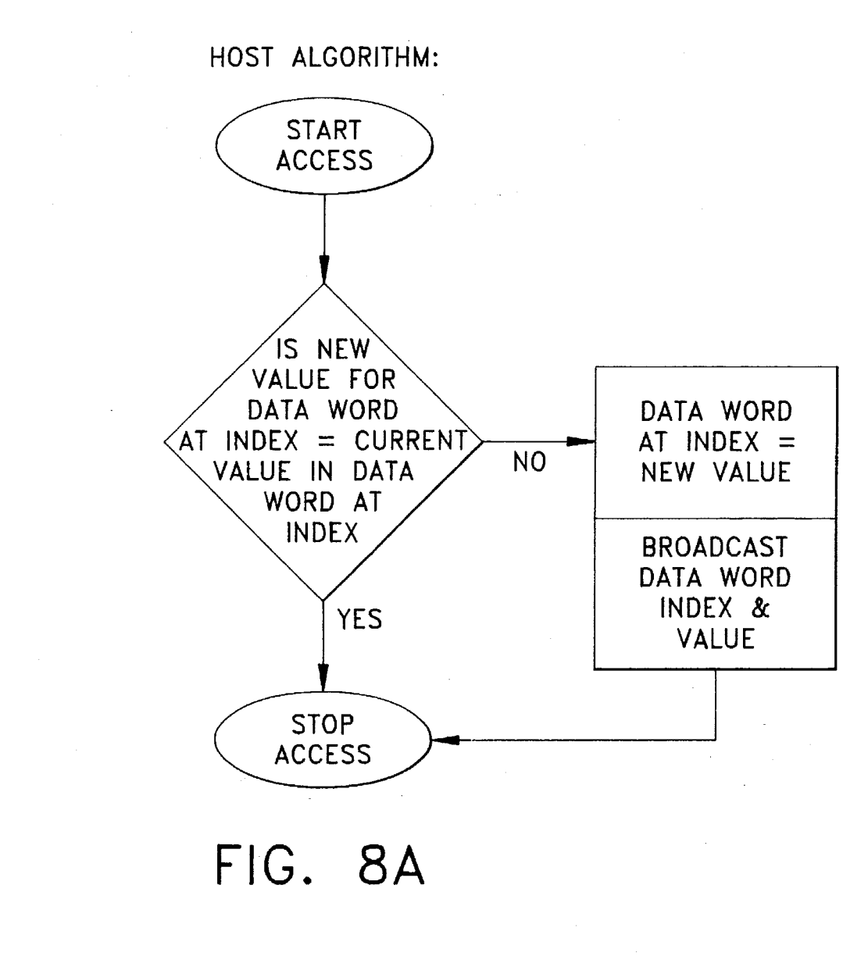
FIGS. 8A and 8B are flow diagrams of the logic of the replication hardware of FIG. 7.
Figure 8B:
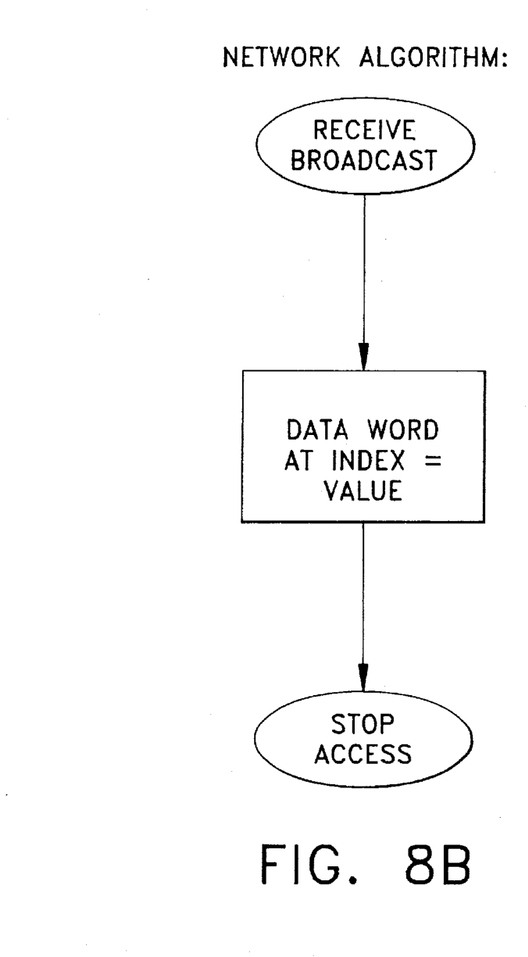

Refer to FIGS. 7, 8A, and 8B for a data word replication hardware system 19, (FIG. 7) and its logical flow diagram, which constitutes another organization from which the present invention stems. Each processor 20v, 20w, and 20x has a respective data base 31p, 31q, and 31r that maintains a copy of data words 24pa, 24pb, 24pc, 24qa, 24qb, 24qc, 24ra, 24rb, and 24rc which are to be shared. 24pa, 24pb, and 24pc each contain identical data words. 24qa, 24qb, and 24qc each contain identical data words as do 24ra, 24rb, and 24rc. A special multi-ported memory is mapped into the processor's physical memory for data sharing between processes. The special memory has logic that intercepts "writes" that change the value of a mapped memory word as shown in FIG. 8A. When any of this memory is modified, it grabs the token 36b, represented by the flag in FIG. 7, from the ring 38a and sends a frame, as shown in FIG. 8A, which is a network implementations of a message, to update the same memory word in every other processor as shown in the flow diagram of FIG. 8B. The token ring 38a regulates updates to the word by inhibiting processors, other than the one with the token, from updating the network. When the token is released to the network, another processor can likewise update the network. A fundamental shortfall with this approach is that presently only physical token ring topologies are supported. A problem with this approach is the absence of locking, a necessity to regulate and serialize access. While this is the fastest replication technique available, it lacks the much needed locking. FIG. 7 also shows data replication hardware 40a, 40b, and 40c (each implementing the logic of FIGS. 8A and 8B) as part of ring 38a. Local data base users 28p, 28q, and 28r are also shown. The processors 20v, 20w, and 20x and token communication ring 38a may be of any suitable off-the-shelf commercial products using one token for each record in the replicated data bases. For example, a successful prototype employing about 100,000 records and 100,000 tokens has been implemented employing Sun Work Station Processor, with the token ring employing conventional packet signals via the well known Carrier Sense Multiple Access Collision Detection (CSMA/CD) protocol standard in connection with common computer network coaxial cable.

The present invention stems from an application of the logical token ring concept of FIG. 6, where a token 36a is used to regulate and serialize access to a network, to the data word replication process or network computing system 19 of FIG. 7. A submarine combat system accesses data items stored in its network computing system. Most processes of a combat system read and write data; thus it is necessary to regulate and serialize access and locking to this data. A token per data item is passed (hence the term token migration) and used to grant lock privilege to at most one process within at most one processor. No lock to any data item is granted in the absence of its token. The token takes different forms within the system. The token is a message during pre and post transmit, a frame during transmit, and a variable in different states within the processors (see FIG. 9).

Figure 9:
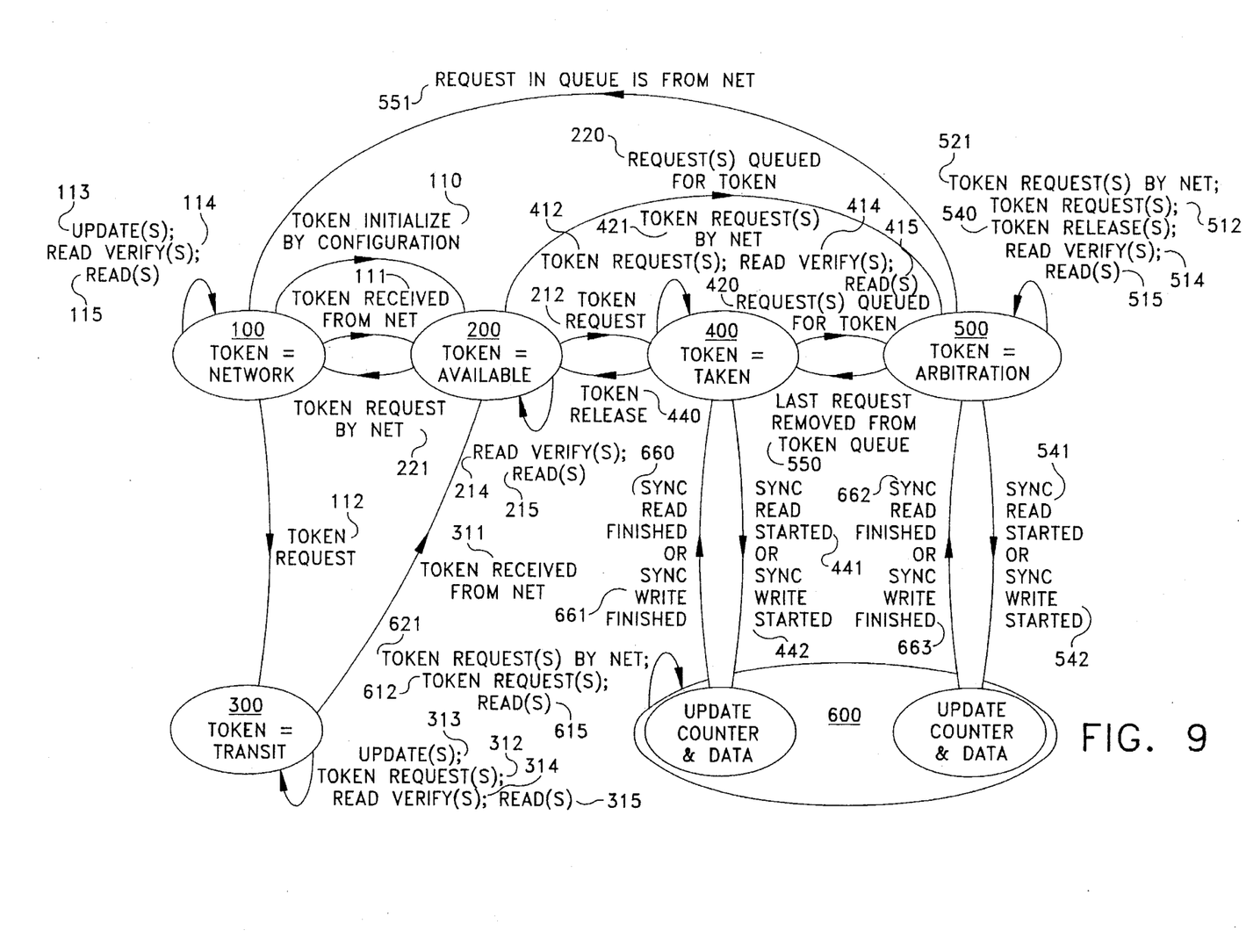
FIG. 9 is a state transition diagram depicting the token migration approach of the present invention.

The following paragraphs elaborate the token states and the messages, events and actions that transition the states. FIG. 9 expresses this as a graph that shows states and transitions. The state device in FIG. 9 is unbiased because it processes queued network requests and local requests in a first come first served order by implementing "Request In Queue Is From Network" transition 551. The state device in FIG. 9 could be modified to be biased to local requests, i.e., all local requests must be satisfied before surrendering the token to some other processor. This could be accomplished by omitting Request In Queue Is From Network transition 551.

Refer now to FIG. 9 for a description of the various token states. When a processor surrenders the token to another processor (i.e., token migrates), the token state at the surrendering processor is said to be in the network state 100. When a token is at a processor but it is not in use, the token state at that processor is said to be in the available state 200.. When a token has a request pending at another processor, the token is at the processor receiving the request, and the token state at the processor making the request is said to be in transit state 300. When a token at a processor is assigned to a process, and no other requests are pending, the token state at the processor is said to be in the token state 400. When a token has at least one request pending and the token is in the local processor, the token state at the local processor is said to be in the arbitration state 500.

The Token Initialization by Configuration 110 transition is used to establish only one processor on the network as the initial owner of the token. The token variable goes from network state 100 to available state 200 on at most and at least one processor. The token managers could be initialized from configuration files. These files could match the initial processing needs, and thus allow a lock balanced system from start up.

The Token Received From Net transition 111 is used to receive the token at a processor. Only one processor on the network can receive ownership of the token when the token is surrendered to the network. The token variable goes from network state 100 to available state 200.

The "Token Received From Network" transition 311 is used to receive the token at only one processor on the network when the token is surrendered to that processor. The token variable goes from the transit state 300 to the available state 200. The processor passing the token goes to the network state 100. All other processors remain in the network state 100.

The Token Request transition 112 is used to queue the process attempting a lock when the token is somewhere on the network. It is also used to request the token from the network. The token state goes from network state 100 to transit state 300 at the processor making the request. The token request 212 transition allows one process on the processor having the token to lock the data item and the token state at the processor having the token goes from the available state 200 to the taken state 400. The transitions 312, 412, 512, and 612, are used to queue the process attempting a lock. The token states do not change.

The Update 113 transition allows changes such as data replication to be made to a data item in a processor that is in the network state 100 from the processor having the token. Likewise, update transition 313 allows changes such as data replication to be made to a data item in a processor that is in the transit state 300 from the processor having the token. The network state 100 and transit state 300 remain the same.

The Read Verify transitions 114, 214, 314, 414, and 514, allow reads without locks. These transitions are used whenever the application is sensitive to data changes. The transitions have no affect on the token states. One system providing the read verify transition is disclosed in Method of Database Synchronization with Consistency Determined by Entry and Exit Counters Used on Both Update and Retrieval filed on Oct. 3, 1991 as U.S. Pat. application Ser. No. 5,307,487, issued Apr. 26, 1994, by Tavares et al. and includes both inventors in the present application. A second system providing the read verify transition is disclosed in Light Update Notification Mechanism for Shared Data Structure filed on Oct. 3, 1991 as U.S. application Ser. No. 07/770,207, now U.S. Pat. No. 5,247,684, issued Sep. 21, 1993, by the same inventors as those in the present application. The read verify transitions can be made by processors whether holding the token or not, at particular times, by keeping track of both updates and writes to the data item.

The Read transitions 115, 215, 315, 415, 515, and 615 allow reads without locks. These transitions are used whenever the application is not sensitive to data changes. The transitions have no affect on the token states.

The Request Queued For Token transitions 220 and 420 are used to start granting locks to processes queued for the token during token release transition(s) 540, 440. When either of the request queued for token 220 and 420 occur, the token state goes from whichever state it is in, the available state 200 or the taken state 400 to the arbitration state 500.

The Token Request By Network transition 221 is used to pass ownership of the token from one processor to another. The processor passing the token goes to the network state 100. The Token Request By Network transitions 421, 521, and 621 are used to queue requests from another processor for the token. If the queuing process is unbiased then the request takes its place in line with all other requests, with local and remote requests getting no priority over each other. If the queuing process is biased all requests from the processor having the token get priority over requests from a remote processor. This can be achieved by having two queues; one for local requests and one for remote requests. The local requests would then have priority over the remote requests even if received at a later time.

The Token Release transition 440 is used to remove the last lock. The token state goes from the taken state 400 to the available state 200. The Token Release transition 540 is used to grant a lock to the next process in the queue, or in other words to go to a new process after usage by another process. The token state remains in the arbitration state 500.

The Request In Queue Is From Network 551 transition is used to pass ownership of the token from one processor to another. This occurs only in the unbiased state machine. In a biased state machine the token would have to pass through other states when the processor in possession of the token had no further local requests. The processor relinquishing the token goes to the network state 100.

Figure 10A:
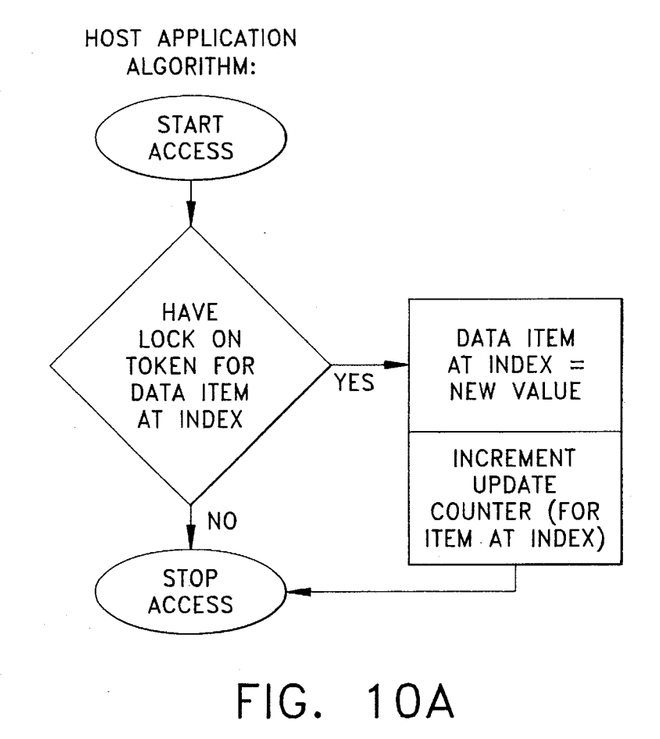
FIGS. 10A, 10B, and 10C are flow diagrams showing the replication logic of the present invention.
Figure 10B:
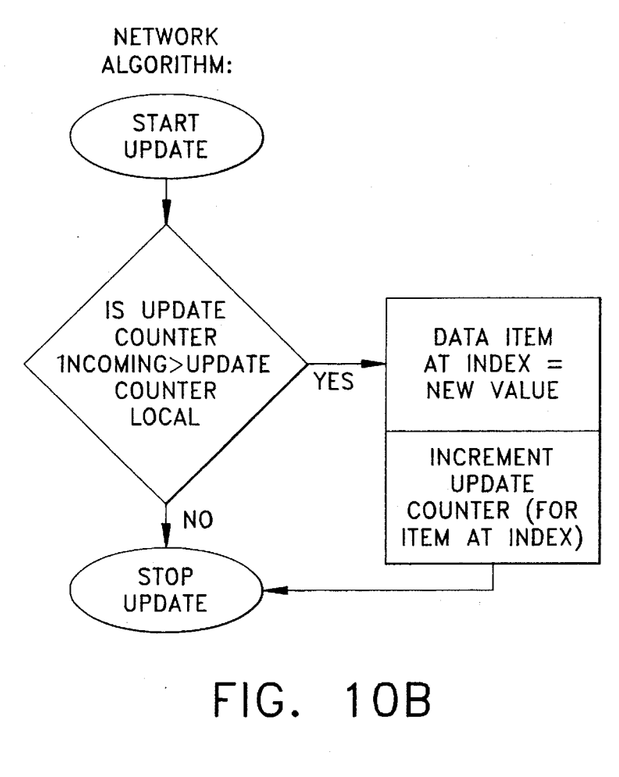
Figure 10C:
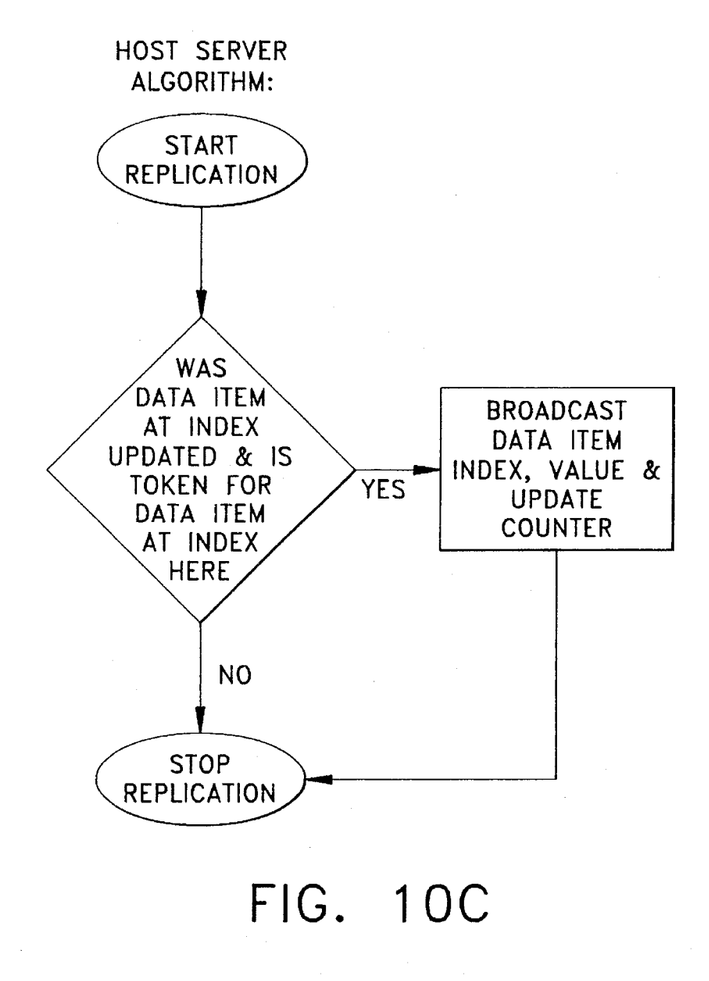

The Synchronous Read Started 441, 541, Synchronous Read Finished 660, 662, Synchronous Write Started 442, 542, and Synchronous Write Finished 661, 663 transitions utilize Update Counter and Data state 600. State 600 is a virtual state (not a real state machine state) that serves only to enumerate the allowed transitions 621, 612, and 615 in the middle of a locked (synchronous) read/write operation. In short, it serves only to demonstrate that Read Verify(s) never complete, and to show that when locks are retained that several other activities (Token Requests by NET, Token Requests and Reads) happen in the system. More particularly, with reference to FIGS. 10A, 10B, and 10C, "background operations" take place as a result of entering state 600. FIG. 10A illustrates the state 600 actions on behalf of the calling process, namely it checks for token presence (token=taken 400, token=arbitration 500, per FIG. 9). If present, it allows the update to occur. FIGS. 10B and 10C illustrate the background actions which take place. For example, server 31s (FIG. 11) executes the logic of FIG. 10C, and the clients 31t and 31u execute the logic of FIG. 10b. FIG. 10C shows that updates are replicated to all other processors, while FIG. 10B shows how the processors replicate data locally. Due to the asynchronous nature of replication in this system (locking is separated from replication), it is possible for a token to migrate before the most recent update arrives at a processor, i.e., the possibility exists that the $i^{-th}+1$ update arrives before the $i^{-th}$ update. Hence, the need for the logic of FIG. 10B.

Figure 11:
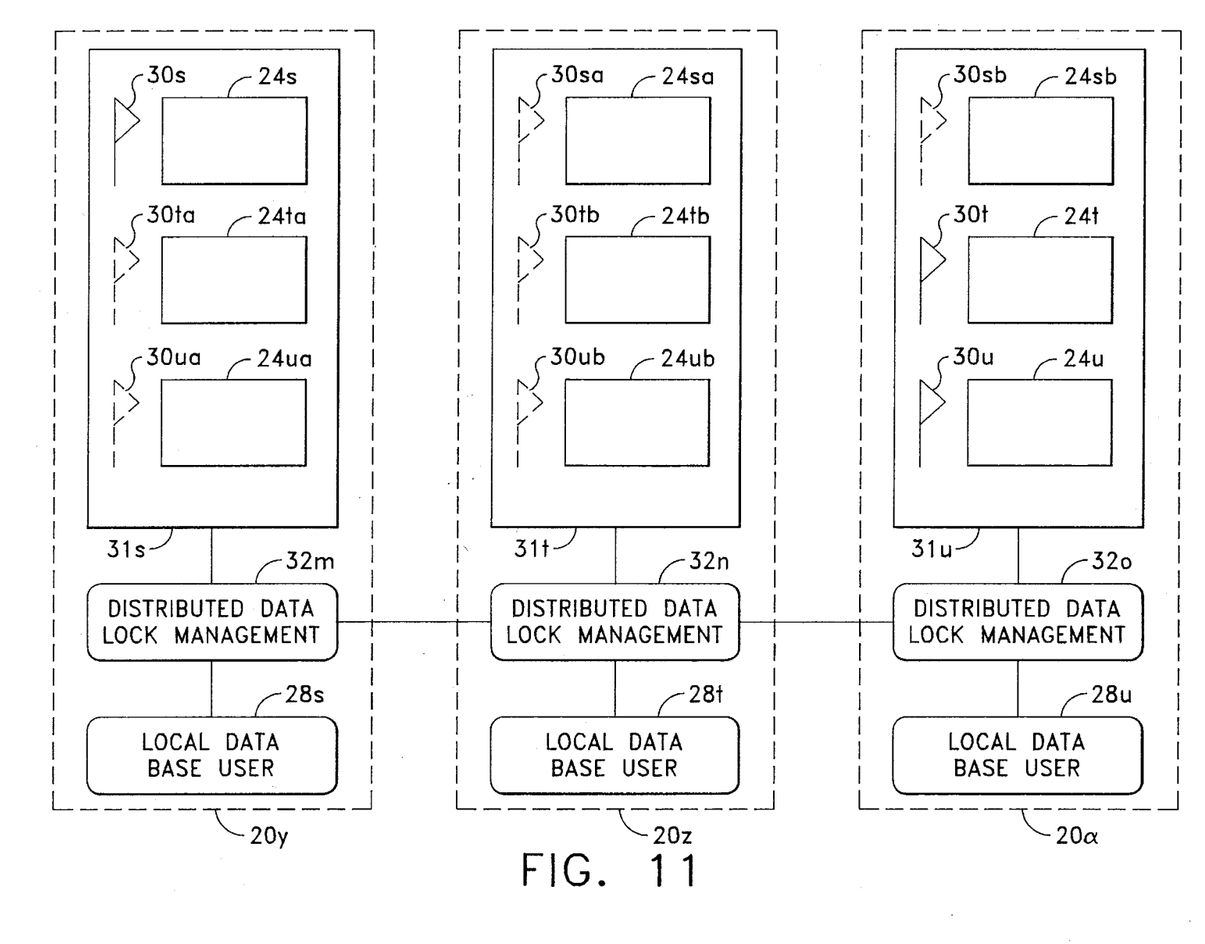
FIG. 11 is a block diagram representing the token migration approach of the present invention for data sharing between processors.

The advantages of using token migration is best expressed by referring to FIG. 11 and using an analysis similar to the other techniques. Thus, for each data item 24s and its replicas 24sa and 24sb the migrating token for data item 24s and its replicas 24sa and 24sb must reside in one processor, which we call the hub processor 20y for original data item 24s and its replicas 24sa 24sb. When an access at processor 20z needs to lock data item 24s and its replicas 24sa and 24sb, it requests the token at the hub processor of 20y. As before, the response to the request is delayed until it can be granted, at which time processor 20z becomes the hub processor for the token of the original data item 24s and its replicas 24sa and 24sb. A similar explanation accounts for operation of the processors 20y, 20z, and 20α for original data item 24t and its replicas 24ta and 24tb, and data item 24u and its replicas 24ua and 24ub. The remaining components show function similarly to those shown and described in prior figures. The flags where the token is present are shown in solid lines.

In this technique, message requests m(i) can be satisfied by local tokens T(i). The cost of this locking technique will be expressed as the total messages M generated in the system for n processors, where each processor p(j) generates t(j)=(m(j)−T(j) messages for m(j) locks, it follows that:

M is the number of messages sent to hubs and returned, excluding local locks;

$M=[t(1)+ \ldots +t(j)+ \ldots +t(n)]*2;$ $M=[\Sigma t(j)]*2;$ $M=\{n*[\Sigma t(j)]/n\}*2$ $M=[n*t]*2$ M=2 nt; and is the cost for this technique.

A conclusion about this technique is that it is less costly than the single coordinator approach whenever $\Sigma T(j)>m$ and it is less costly than the primary copy whenever $\Sigma T(j)>\Sigma 1(j)$. These are criteria that can be fulfilled as the tokens of data items migrate to the processors where processes are locking data items. As this happens, nT, local locks, rises to exceed m and nl, local locks. This technique is consistent with the combat system profile described earlier, i.e., lock requests for a data item are usually performed by only one process within one processor. Experience indicates that in a balanced system (i.e., tokens have migrated as needed) that nT (local locks) can approach nm (global locks) and that M can approach some small average dynamics 2 nt related to system processing adjustments. As the foregoing indicates, this M on a balanced system is a much lower cost than the techniques discussed earlier.

There has therefore been described an improved system and method to implement network level data bases. The migrating token provides localized locks and depending on the system used can provide all processes requested at the processor where the token resides before migrating or can queue for an operation of processes in the order received.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of managing the power of individual processors to perform processes including managing data sharing between processors on a network by a locking and unlocking of data items, utilizing a migrating token, where the processors has at least one data item, each of said at least one data item being an original or replicated data item, comprising the steps of:

forming the following series of operational states within each processor, with each processor being in one of said operational states and transitioning from one state to another upon certain happenings, a token being the sole entitlement for each of said processors to transmit data on said network, and said token migrates among each of said processors, the states being: (A) the absence of said token, (B) the token being at the processor but not in use, (C) requesting the token from another processor, (D) the token being assigned to a process at the processor but no other requests are pending, (E) the token having at least one request pending and the token being in the processor;

controlling the transitioning from one state to another such that all except one processor is in one of states (A) and (C), and said one processor is in one of states (B), (D), and (E);

controlling the transitioning from one state to another such that each processor in state (A) can transition to state (C) upon requesting and not receiving said token, so that a plurality Of processors can be in state (C) at the same time; and said processors in each of states (A), (B), (C), (D), and (E) can read verify a data item without changing states.

2. A method according to claim 1 wherein a processor in state (A) can carry out each of the following without changing state:

updating a data item; and reading a data item.

3. A method according to claim 2 wherein a processor in state (A) can transition to state (B) comprising the step of transitioning to state (B) upon requesting and receiving said token.

4. A method according to claim 3 wherein exactly one processor in state (A) transitions to state (B) comprising the step of token initializing by configuration.

5. A method according to claim 1 wherein a processor in state (B) can carry out the process of reading a data item without changing state.

6. A method according to claim 5 wherein a processor in state (B) transitions to another state comprising the step of transitioning to state (A) on Token Request By Network by passing ownership of the token to another processor.

7. A method according to claim 6 wherein a processor in state (B) transitions to another state comprising the step of transitioning to state (E) on Request Queued For Token by granting a lock to a process queued for the token.

8. A method according to claim 7 wherein a processor in state (B) transitions to another state comprising the step of transitioning to state (D) on Token Request when one process on the processor in state (B) locks a data item.

9. A method according to claim 1 wherein a processor in state (C) can carry out each of the following processes without changing state:

updating a data item;

placing a new token request for said migrating token; and reading a data item.

10. A method according to claim 9 wherein a processor in state (C) transitions to another state comprising the step of transitioning to state (B) upon receiving said migrating token.

11. A method according to claim 1 wherein a processor in state (D) can carry out each of the following processes without changing state:

queuing a Token Requested process attempting a lock when the token is held by a Token Not Yet Released process;

queuing a Token Request By Network; and reading a data item.

12. A method according to claim 11 wherein a processor in state (D) transitions to another state comprising the step of moving to state (B) on Token Release by removing a last lock on the token.

13. A method according to claim 12 wherein a processor in state (D) transitions to another state comprising the step of transitioning to state (E) on Request Queued For Token to start granting locks to processes queued for the token as Token Release transitions occur.

14. A method according to claim 1 wherein a processor in state (E) can carry out each of the following processes without changing state:

queuing the Token Request By Network;

queuing a process attempting a lock when the token is held by another process;

granting a lock to a next process in the queue by Token Release; and reading a data item.

15. A method according to claim 14 wherein a processor in state (E) transitions to another state comprising the step of transitioning to state (D) on Last Request Removed From Token Queue when a last process is granted a lock.

16. A method according to claim 15 wherein a processor in state (E) transitions to another state comprising the step of transitioning to state (A) on Request in Queue Is From Network by passing ownership of the token to one of the other processors on the network.

* * * * *